United States Patent [19]

Brynjegard

[11] 4,149,304
[45] Apr. 17, 1979

[54] METHOD OF MAKING ROLLS FOR FORMING RADAR REFLECTIVE SURFACES

[76] Inventor: Olaf G. Brynjegard, 4925 Howes La., San Jose, Calif. 95118

[21] Appl. No.: 832,281

[22] Filed: Sep. 12, 1977

[51] Int. Cl.² .......................... B21K 1/02; B21K 5/20; B23P 19/00
[52] U.S. Cl. .................. 29/148.4 D; 29/121.2; 29/434; 29/445; 51/289 R; 51/326; 76/107 R; 72/196
[58] Field of Search ................. 350/102–109, 350/29, 113; 76/107 R; 51/289 R, 326, 327; 29/434, 121, 148.4 D, 445; 72/196

[56] References Cited

U.S. PATENT DOCUMENTS

| | | | |
|---|---|---|---|
| 1,430,385 | 9/1922 | Komarek | 76/107 R UX |
| 1,822,451 | 9/1931 | Oestnaes | 76/107 R UX |
| 2,203,200 | 6/1940 | Komarek | 76/107 R |
| 2,572,275 | 10/1951 | Millmather, Jr. | 51/326 |
| 3,022,231 | 2/1962 | Broderick | 76/107 R X |
| 3,042,996 | 7/1962 | Nelson | 29/148.4 D |
| 3,079,741 | 3/1963 | Render | 51/289 R |
| 3,905,283 | 9/1975 | Baker | 76/107 R X |
| 3,979,859 | 9/1976 | Miller | 51/327 X |

FOREIGN PATENT DOCUMENTS 725749   2/1932   France ................... 76/107 R

*Primary Examiner*—Charlie T. Moon
*Attorney, Agent, or Firm*—Wm. J. Gribble

[57] ABSTRACT

A plurality of concave or convex cube corners are formed in a radar transparent solid or on a reflective substance in a uniform repetitive pattern. The reflective substance may be flexible so as to adapt to warped surface mounting, as for instance on the outer surface of aircraft access panels or other outer recessed panels. A smooth optical blank may be ground by passing the same beveled cutting wheel across the back side of the blank along three paths diverging 120°. A flexible reflector may be formed by passing the substance between gear-connected rollers patterned in male and female fashion with the cube corner pattern. The invention may be utilized in radar reflectors on vehicles of various sorts to make them more visible to radar emergency situations as encountered by downed aircraft, ships in fog, or lost individuals.

1 Claim, 17 Drawing Figures

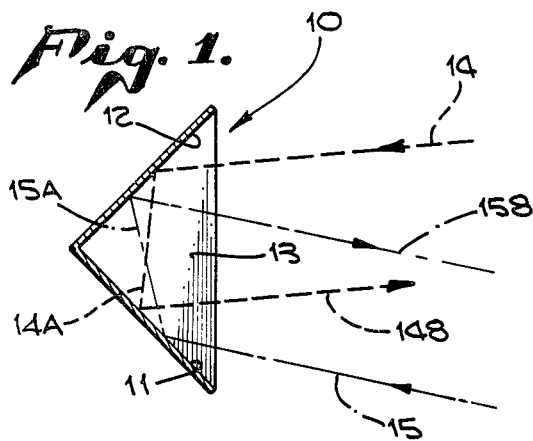
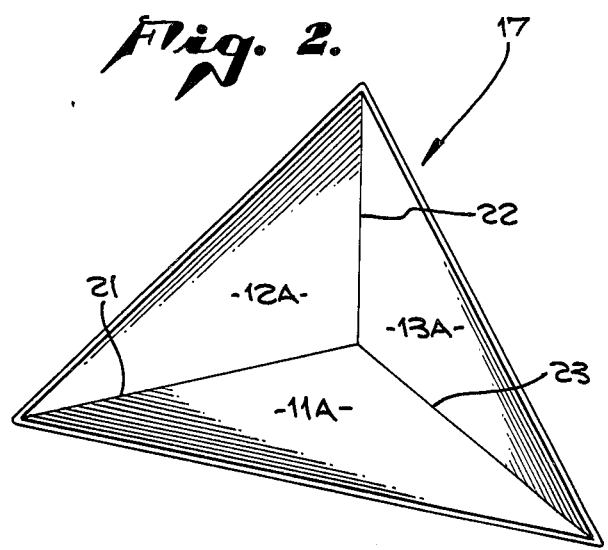
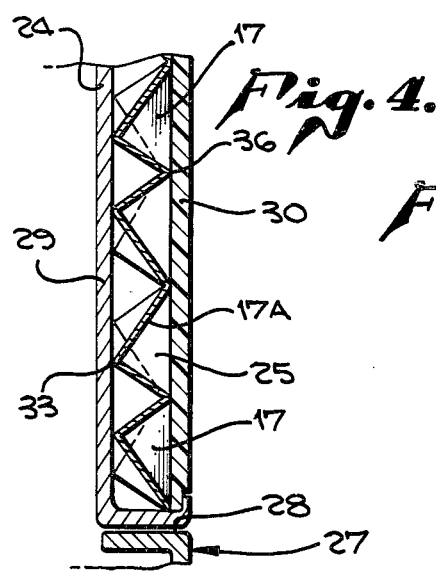
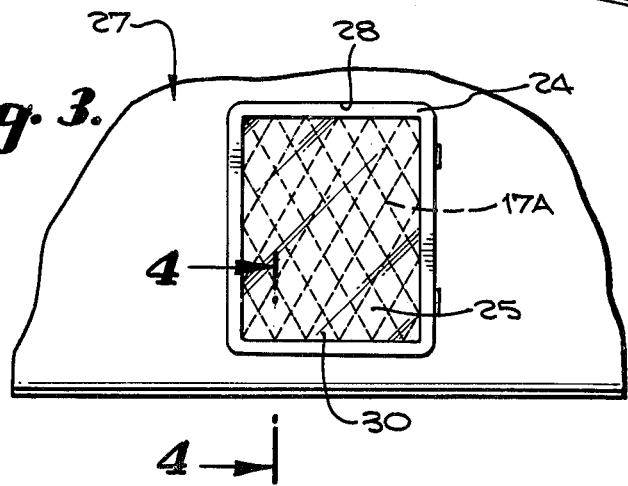
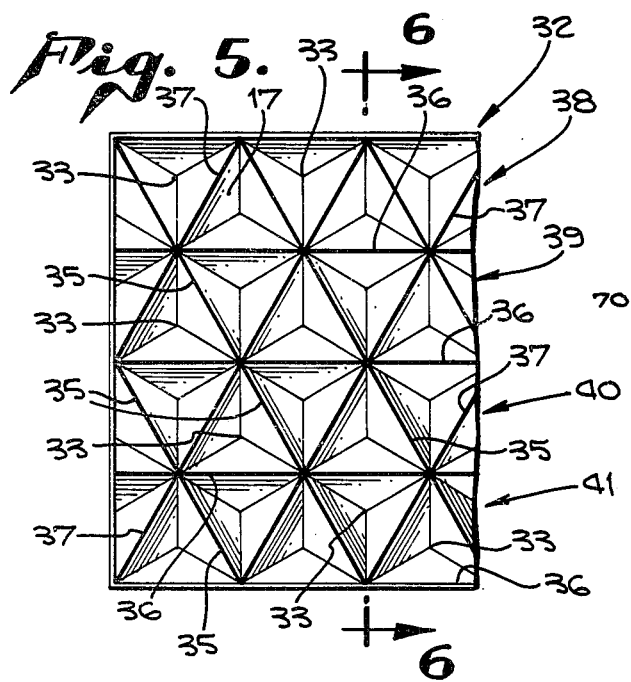
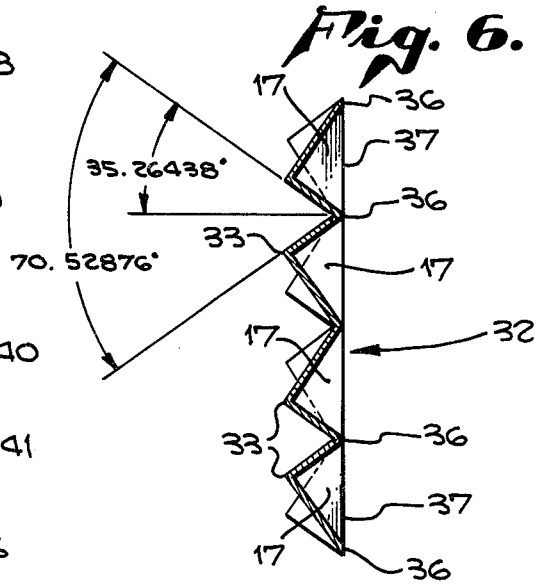

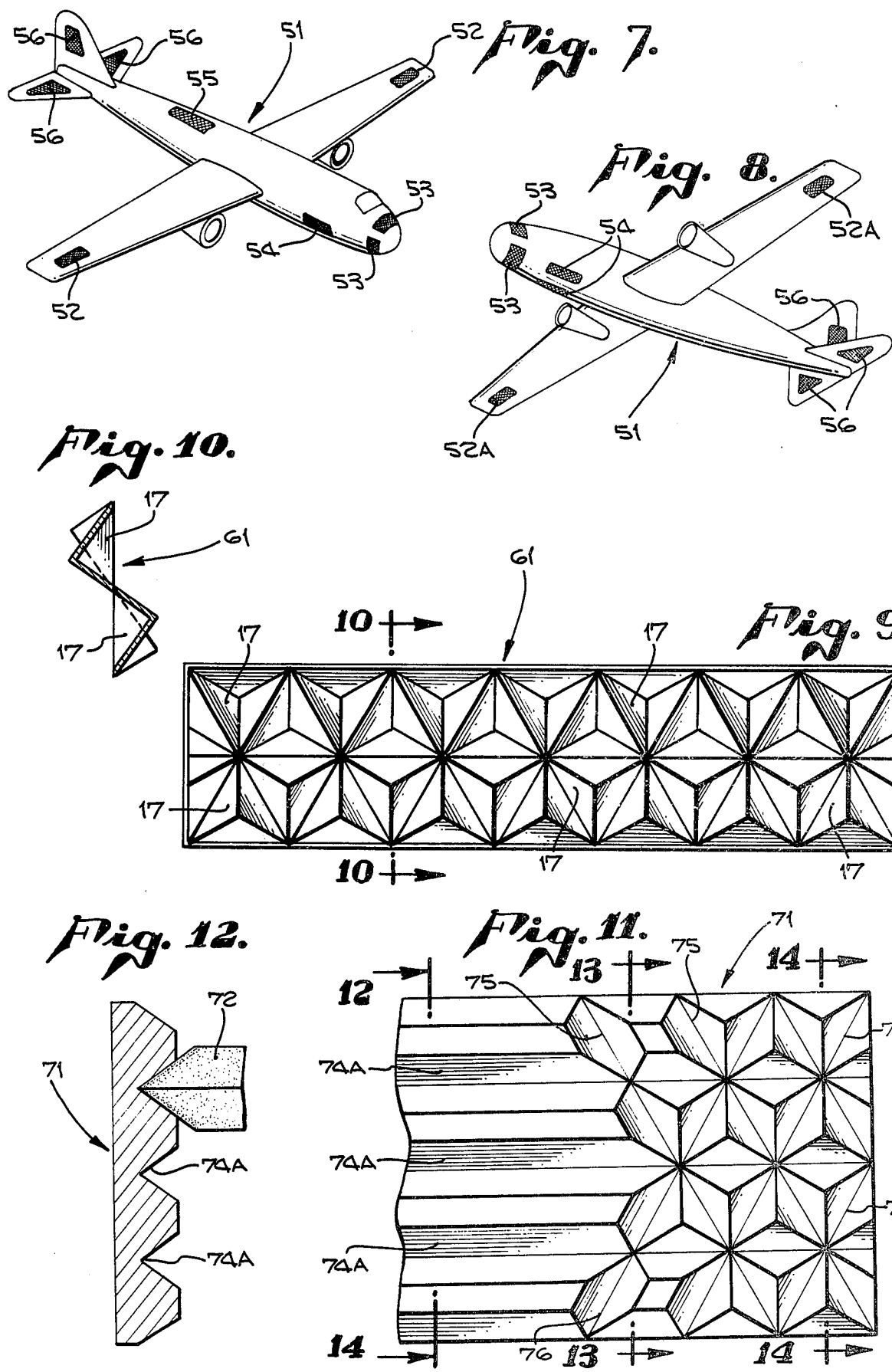

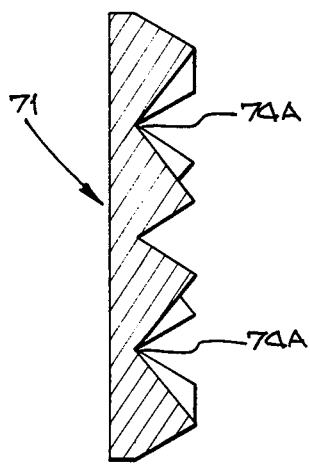
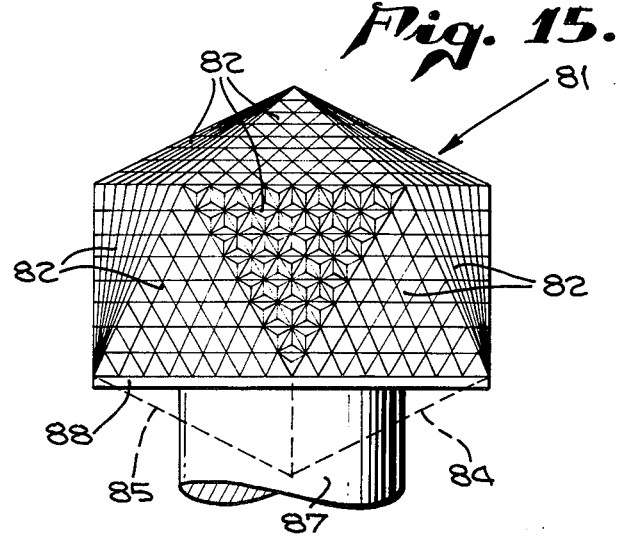
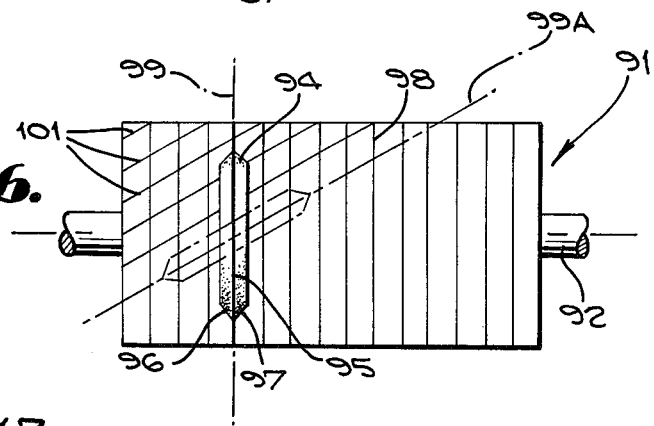
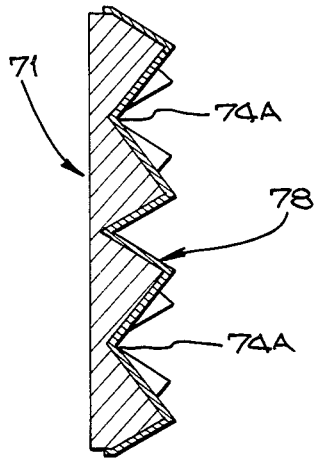
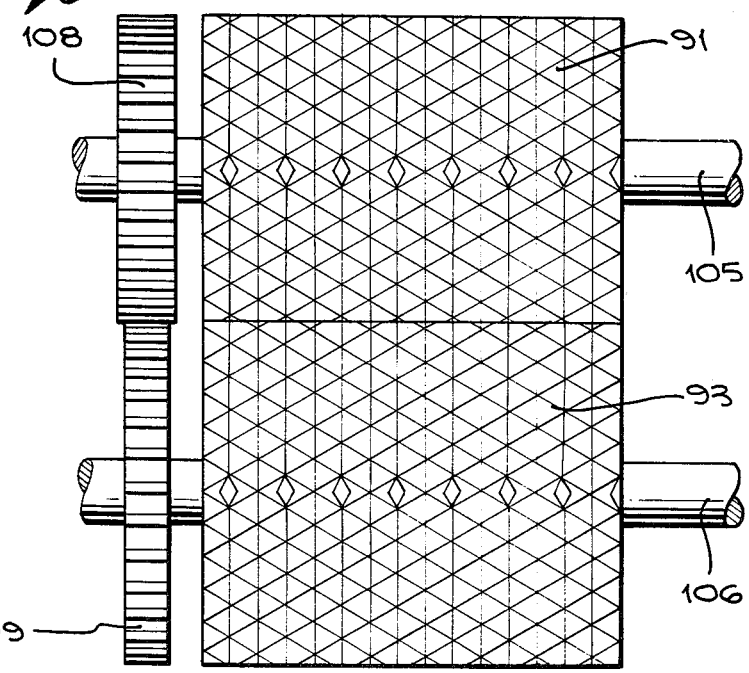

METHOD OF MAKING ROLLS FOR FORMING RADAR REFLECTIVE SURFACES

BACKGROUND OF THE INVENTION

The invention relates to radar reflective apparatus and manufacturing methods for producing reflectors for high frequency radiation such as radar and more particularly to reflectors for vehicles which may become lost. The apparatus of the invention is based on the principle that radiation, at radar frequencies, reflects in lines or paths parallel to the incidence path from a triplanar reflector in which each plane is mutually perpendicular to the other planes. Such devices are exemplified in part by U.S. Letters Pat. No. 3,684,348 entitled "Retroreflective Material" issued August 15, 1972 to William P. Rowland. The invention has for an object affording reflective apparatus usable in several fields and made by methods conducive to accuracy and economy, bypassing expensive molding and finishing techniques presently needed to achieve sharp plane intersection edges and corners.

SUMMARY OF THE INVENTION

The invention contemplates energy reflecting surfaces each comprising a plurality of triplanar faceted reflective corners in uniformly distributed multiples, each facet of a corner being perpendicular to the other two facets, comprised of an embossed reflective material or a shaped, radiant energy-transparent solid with a reflective coating.

The shaped surface may be formed by a method including the steps of cutting the reverse face of a radiant energy-transparent solid having a planar observe face with a cutter having cutting faces diverging from a point at an angle of approximately 35.26439° (35° 15' 52"), said cutter describing a first cut path, cutting a second cut path at an angle to the first and second paths, said paths being at angles of 120° to one another to define convex cube corners on the reverse surface of the solid, and then applying a reflective coating to said convex corner surfaces.

Said cutting method can be used to achieve a properly rotating impression roller as the beginning process for making a reflective ribbon or strip in accordance with the invention from a reflective material. The impression roller so made is then impressed upon a second roller so as to impinge a concave pattern of cube corners uniformly upon the second roller. Preferably the circumferences of the two rollers are unlike, so as to avoid continuous impingement of the same cube convexity in the same cube concavity, although it is obvious that the circumferences of both must be a multiple of the repeat pattern arcuate increment. After being impinged, the second roller is hardened by heat treatment or chemical means, and linked in a geared system with the first roller to pass reflective material between them to form a continuous ribbon or strip of triplanar reflective corners.

The apparatus and method of the invention are more readily comprehended in the light of the following detailed description and drawing.

BRIEF DESCRIPTION OF THE DRAWING

FIG. 1 is a schematic sectional representation of a reflective corner in accordance with the invention;

FIG. 2 is a perspective view of such a triplanar reflective unit;

FIG. 3 is a fragmentary plan view of a reflective panel in accordance with the invention in place on a vehicle;

FIG. 4 is a sectional view taken along line 4—4 of FIG. 3;

FIG. 5 is a fragmentary plan view of an alternate embodiment of the invention;

FIG. 6 is a sectional view taken along line 6—6 of FIG. 5.

FIGS. 7 and 8 are schematic perspective views of aircraft showing respectively, upper and lower placement of radar reflective panels;

FIG. 9 is a fragmentary elevational view of an alternate two-faced embodiment of the invention adapted to anti-radar chaff use;

FIG. 10 is a transverse sectional view taken along line 10—10 of FIG. 9.

FIG. 11 is a fragmentary plan view of a die blank in the process of fabrication to form reflective sheets in accordance with the invention;

FIGS. 12, 13 and 14 are sectional elevational views taken along lines 12—12, 13—13 and 14—14, respectively, of FIG. 11 and showing progressive stages of blank formation;

FIG. 15 is a still further alternate embodiment showing an icosahedron radar reflector in elevation in truncated form;

FIG. 16 is a side elevation of an impression roller being formed in accordance with the invention; and FIG. 17 is an elevational view showing first and second impression rollers assembled to form reflective ribbons on sheets in accordance with the invention.

DESCRIPTION OF THE PREFERRED EMBODIMENTS

In the various Figures like parts are identified by like reference numbers.

FIG. 1 shows schematically an individual tripanel reflecting corner 10 having mutually perpendicular planar faces 11, 12 and 13. Broken line 14, and its segments 14A, 14B, represents the reflection path of radiant beam through the reflecting corner. As can be seen from the schematic figure, line 14B is parallel to line 14 such that the beam is reflected back to its source. Similarly, the dot dash line 15, 15A, 15B represents a radiant beam that enters into the triplanar corner and reflects outwardly in a path 15B parallel to path 15. Because of the mutually perpendicular orientation of the three reflective surfaces, the parallelism between converging and emerging beams is constant regardless of which of the three reflective planes the beam first encounters. Therefore, for all radiant beams impinging upon the corner surfaces there is a parallel return path to the source of the beam.

In FIG. 2 a perspective view of an individual reflective cube corner 17 shows planar reflective surfaces 11A, 12A and 13A, each surface being triangular. FIG. 2 shows graphically the desired sharpness of the convergence of the planes forming the right angle dihedral between each of the planes.

It is preferable that the corner surfaces 21, 22 and 23 between reflective planes and represented in FIG. 2 as single lines have as little radius as possible. Preferably the area of semicylindrical surface of each corner is the minimum that manufacturing techniques will allow, preferably less than five per cent of the total surface of the planar reflective triangle, such as the triangular reflective surface 11A.

VEHICLE LOCATION UTILIZATION

FIGS. 3 and 4 illustrate a rectangular plurality of concave cube corners such as the cube 17 of FIG. 2 combined with a hatch 24 to define a reflective vehicle access panel 25. As can be seen from FIG. 3 the outer surface 26 of a vehicle 27 has an opening 28 for access to adjustable controls or fuel supply or other vehicle service units (not shown). Opening 27 is closed by hatch 24. The door comprises a drawn shallow frame 29 and a radar-transparent outer plate 30. Alternatively, a solid fill may replace the plate. The plurality 17A of reflecting corner cubes 17 is retained within the shallow door by transparent plate 30, yet because of the radar transparency of such plate the plurality is effective in reflecting radar waves in parallel fashion back to the radar source for detection of the vehicle.

Similarly, radar reflectors may be in narrow strips such as the strip 32 shown in FIGS. 5 and 6. A reflective material such as aluminum foil or the like, is formed into strips 32 each having a plurality of triplanar concavities or cube corners 17, each having its apex 33 so oriented with respect to the plane of strip 32 that the edges 35, 36, 37 of each triplanar cube corner intersect a plane of the strip as an equilateral triangle. The resulting pattern in the plane of the strip is a plurality of triplanar corner rows 38, 39, 40, 41 bordered by parallel edges 36 in which adjacent triplanar corners are oppositely oriented with respect to the transverse placement of their apices 33. The diagonal corner edges 35, 37 align in each of the parallel rows to form opposite diagonals transversely of the strip 32 extending at 60 degrees to the axis of the strip. The strip axis is parallel in each of the corner rows to the reflective surface edges 36, which also align in each row. The invention is not limited to strips with any particular number of rows.

Such orientation and pattern is achieved if the true dihedral angle in the transverse plane as indicated by line 6—6 of FIG. 5 is 70.52878°. A forming tool having this acute angle for its working head can therefore be passed along the line defined by the aligned surface edges 36 to define a reflective surface on either side of the aligned edges 36. Similarly, an angular forming tool having an included angle of 70.52878° may be passed along the diagonal aligned edges 35 of edges 37 similarly to achieve the pattern of repetitive triplanar reflective corners of the foil strip of FIGS. 5 and 6. Apparatus for achieving the form illustrated in FIGS. 5 and 6 is explained later with respect to FIGS. 11, 16 and 17.

The strips 32 of FIG. 5 may be rolled along the aligned edges 36, and therefore panels or strips may be stored in tubes for emergency employment by individuals apart from being fixed to land on sea vehicles.

FIGS. 7 and 8 illustrate schematically an aircraft 51 equipped with radar reflective panels in accordance with the invention. As set forth with respect to FIG. 3, it is presently preferable that the panels be applied to points where existing access doors or panels are conventional. However, new aircraft may be built incorporating panels in more strategic positions from the standpoint of aircraft detection without the need of retro-fitting panel or access doors. For instance, the aircraft of FIGS. 7 and 8 is shown with upper wing reflective panels 52 and lower wing reflective panels 52A, which may be incorporated as a part of the original aircraft construction. Or, if the design top speed of the aircraft is relatively low, foil such as that described with respect to FIGS. 5 and 6 may be applied to the skin. In any event the reflective surfaces of the invention should not be applied on the aircraft to interfere with structural or operational strength, which is one reason that inspection or other access panels conformed to the retroflecting material is the presently preferred mode for applying the radar reflective surface areas.

In addition to the radar reflective wing panels the aircraft is shown with nose panels 53, lower front fuselage panels 54, upper mid-fuselage panel 55 and tail fin and stabilizer panels 56. With respect to those rear section panels it may be stated that in crash situations the tail surfaces of an aircraft generally survive with structural integrity preserved. The tail surfaces are therefore the best area in which to concentrate radar reflective units if detection of downed aircraft is most desired. With such an arrangement radar reflective panels of downed aircraft, even in dense cover, present a long lasting and constant passive reflector not dependent on power source longivity or fragility like present rescue beacon equipment is.

With regard to newly fabricated aircraft, radar reflective panels may be structural panels formed with a radar reflective pattern and filled with a radar transparent epoxy or other radar-transparent solid to present a smooth, strong exterior surface which does not interfere with operational strength or performance of the aircraft.

Aircraft or other vehicles such as land craft and most watercraft may more reliably reflect ground and airborne radar signals by the instant invention. At present radar detection efficiency depends in part upon the size and material of the object being detected. With the use of the radar reflective surfaces of the invention the smallness of the craft or vehicle does not inhibit a strong radar return signal.

The multiple cube corner reflectors of the invention reflect any wave length of signal as long as the ribbons total length equals at least $\frac{1}{4}$ wave length of the frequency to be reflected. It does not matter how many cube corners comprise this $\frac{1}{4}$ wave length unit since the ribbon is analogous to a calculus function. Each segment or wave length fraction projected into the cube corners is a differentiating action and the reflected output is the reintegrating action back to the frequency of the wave length being reflected. It can thus be seen that the total length of the metallic surface is not critical and each surface serves an infinite number of wave lengths to be reflected.

Counter Radar Utility

In FIGS. 9 and 10 a metallic ribbon for counter radar use is illustrated. The ribbon 61 is comprised of two rows of similar cube corners 17, said rows being reversed as to back-to-front orientation with respect to the plane of the ribbon or strip 61. As is well known when the "chaff" or other counter radar reflectors are scattered from airborne sites the chaff tends to tumble as it falls. This is partly because of the thin gauge of other aluminum or metallic material from which conventional chaff is made. The strips 61 of the invention may be made of thin gauge aluminum but will reflect many times the signal amplitude which conventional chaff reflects because of the triplanar corner cubes facing oppositely on each strip 61. Both obverse and referse chaff sides reflect efficiently as the ribbon twists and falls. Thus radar will "see" large stronger imagery on the detection screens in the absence of any aircraft, that is usually represented by the signal return from conventional chaff.

The strip 61 can be made in a ribbon form with only the two reversed rows of cube corners extending the length of the ribbon. Alternatively two, four or six rows may be utilized depending upon the reflected image desired.

Reflective Surface Forming

FIGS. 11 through 14 illustrate the steps of a process for forming a die blank by which the pattern of the cube corners may be pressed on foil sheets. In FIGS. 11 and 12 a blank 71 is being cut by a grinding wheel 72. The grinding tool rotates in a plane perpendicular to the flat surface of the blank and the tool's cutting edge is a symmetrical dihedral angle of 70.529°, approximately. First the triangular groove like the grooves 74A are cut along the length of the blank. The face of the die blank then has the appearance shown in FIG. 11 in the area of line 12—12 and the cross-sectional configuration of FIG. 12. The orientation of the blank and the cutting path of the grinding wheel 72 is then changed such that the wheel scribes a symmetrical groove along diagonal lines 75 at an angle 60° to the previously ground grooves 74A. The blank then has an appearance as shown in FIG. 11 in the area of the line 13—13 with a cross-sectional aspect as shown in FIG. 13.

The orientation of the die blank and the grinding path is again changed and symmetrical grooves parallel to each other and at an angle of 60° to groove 74A are cut in the blank, resulting in the configuration shown in the area of line 14—14 in FIG. 11. The cross-sectional aspect of this area is shown in FIG. 14. The die may then be used to impress a radar reflective surface so as to form the plural cube corner surface 78 shown in FIG. 14 in contact with the formed surfaces of the die 71.

In an alternate embodiment (not shown) the formed blank 71 may be a radar reflector base of radiant energy transparent material with a plated coating on the blank in the position of foil strip 78 in FIG. 14 such that a radar reflective panel is thus defined. The panel will have a plurality of convex reflective cube corners each defined by three reflective surfaces, the pattern on which is visible in the cross section of FIG. 14. As previously disclosed, the edges which define each of the cubes are preferably formed with a minimal semi-cylindrical or radius corner which is no more than 5% of the total planar surfaces of each of the reflective corner cubes. The invention does not preclude radiant energy reflective panels in which the converging edges of the cube corners have an aggregate area more than 5% of the total planar surfaces of a cube corner, but such a configuration is not as efficient as when the flat reflective surfaces of each triplanar cube corner are of maximum configuration as in the previously described embodiments.

While the reflective strips of the previously described embodiments are adapted to reflect radiant energy such as radar and radio waves the strip of FIG. 5 is particularly adaptable to radar reflection usage. With increasing frequency small sea and lake craft are fabricated from low-reflecting materials, such as fiberglass and fiberglass-coated wood and sail craft and other small boats project no large reflective surface above the water. An efficient reflector is therefore advantageous for such craft, particularly those doing coastal sailing where course deviations may be great. The embodiment of FIG. 15 is particularly directed toward usage as a radar reflector. The reflector 81 illustrated in FIG. 15 comprises an icosahedron of which each facet is an equilateral triangle such as the triangle 82, the surface of which may be comprised from a multiplicity of reflective cube corners like the corner 17 of FIG. 2. The triangular facets may be cut from strips from the reflective foil of FIG. 5 or may be individual triangular pieces.

In either formation the bottom facets indicated by the dotted lines 84, 85 of the icosahedron are removed or not used and a support post 87, which may be the top portion of a sail mast, supports a platform 88 to which the truncated icosahedron is fixed. The radar reflector of FIG. 15 is extremely efficient since the triangular facets such as the facet 72 can receive and reflect to the source radar signals from any compass direction including spotting aircraft flying overhead. Because each of the multiplicity of reflective cube corners returns a received signal to its source a strong signal is received at the source from several of the facets of the icosahedron. Therefore, a craft or other vehicle having little "radar presence" apart from the reflector is strongly visible on a radar screen because of the strength of the return signal from the icosahedron reflector.

While an icosahedron structure has been used illustratively, shapes such as tetrahedrons and octahedrons may be used, since all have equilateral triangles comprising their outer surfaces. The equilateral triangle, of course, is adapted to the plurality of concave cube corners which make up the reflective surface of the radiant energy reflectors of the invention.

A process previously described with respect to the die blank of FIG. 11 may be utilized for grinding rollers for fabricating radar reflective sheets or strips in accordance with the invention. In FIG. 16 a roller blank 91 fixed to rotate on a shaft 92 is shown schematically associated with a grinding wheel 94 which has a grinding edge 95 defined by surfaces 96, 97 forming an angle of 70.5278° (70° 31 min. 34 sec.). The circumference of the roller blank is calculated to equal the longitudinal sum of a plurality of concave cube corners as shown in FIG. 5. A plurality of triangular grooves indicated by the line 98 are first cut to the proper depth in the periphery of the roller 91. The orientation of the grinding wheel is then changed such that its plane of rotation indicated by the line 99 is at 60° to the ground grooves indicated by the line 98. A plurality of spiral grooves indicated by the lines 101 are formed by the cutter 94 by rotating the roller 91 and advancing the cutter axially at the rate necessary to maintain the groove of lines 101 at 60° to the lines 98.

The grinding wheel 94 is then oppositely oriented to the line 99 at an angle of 60 degrees to the line 98 and the grinder is traversed along the rotating roller 91 to incise the grooves to complete the formation of a multiplicity of convex cube corners on the roller.

The roller 91 can then be used to impress the concave pattern of cube corners on a female roller 93 shown in FIG. 17. Preferably the circumference of roller 93 differs from that of the roller 91 although both circumferences are multiples of the reflective surface edge 36 of an individual reflective cube corner 17.

Several methods of affording a hard surface on the concave cube corners of female roller 93 already exist. A metallic shell can be impressed by the convex roller 91 and the shell fixed to a cylindrical rigid core. The pattern of a convex corner reflective cubes can alternatively be imposed upon a soft material roller 93A and that roller case-hardened or plated to form the female roller. Alternatively, a lost wax process may be utilized to preform a master mold from which the roller 93 may be molded and plated or hardened. All these processes are conventional.

The unique method of the invention for forming reflectors contemplates passing malleable reflective strip between the male and female rollers having the continuous pattern of a plurality of reflective cube corners. Preferably the rollers are on parallel shafts 105,106 one of which shafts is driven and the rollers corrdinated in their rotation by gears 108,109, also fixed to the shafts. In the preferred embodiment of the lower apparatus the tooth ratio of the gears 98,99, while calculated to maintain the orientation of the convex cube corners or roller 91 with the concave cube corner of the roller 93, is such that the roller circumferences may differ to preclude a particular convex cube corner lodging in the same concave cube corner on successive revolutions of the rollers. Such an arrangement minimizes rapid wearing of the convex and concave forming surfaces.

The reflectors, forming apparatus and forming methods set forth herein are exemplary. Many variations in apparatus, product and process will occur to those skilled in this particular art. It is therefore desired that the invention be measured by the appended claims rather than by the illustrative embodiments set forth in the foregoing description and drawing.

I claim:

1. A process for forming apparatus for making radiant energy reflectors from reflective thin strips comprising the steps of cutting in successive passes of a cutter having a cutting edge defined by faces diverging symmetrically from the central plane of cutter motion at an angle of 35.26438 degrees along the periphery of a first roller whose circumference is a multiple of the edge measure of a cube corner reflective surface; each of the passes of a first group being parallel to the axis of rotation of the first roller, each of the passes of a second group being at an angle of 120 degrees to the passes of the first group, and a third group of passes each of which is along a path at 120 degrees to the passes of the first and second pass groups; imposing upon a second roller of differing circumference from the first roller a reverse concave pattern of that pattern achieved on the first roller; said second roller having a circumference equal to a multiple of the edge measure of a cube corner reflective surface; mounting on parallel axes the first and second rollers such that the convex cube corner rows of one roller impinge exactly in the concave cube corner rows of the other roller; and connecting drive means between the first and second rollers such that the ratio of rotational speeds of the rollers are commensurate with the ratio of their respective circumferences.

* * * * *